United States Patent
Shan et al.

(10) Patent No.: US 7,324,165 B2
(45) Date of Patent: Jan. 29, 2008

(54) [AUTOMATIC CONTRAST LIMITING CIRCUIT AND METHOD THEREOF WITH SPATIAL DOMAIN INFINITE IMPULSE RESPONSE FILTER]

(75) Inventors: Pei-Ming Shan, Hsinchu (TW); Ming-Cheng Sun, Taichung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 499 days.

(21) Appl. No.: 10/708,015

(22) Filed: Feb. 3, 2004

(65) Prior Publication Data

US 2005/0111750 A1    May 26, 2005

(51) Int. Cl.
*H04N 5/57* (2006.01)
(52) U.S. Cl. ............... 348/678; 348/673; 348/687; 382/274; 358/532
(58) Field of Classification Search ........... 348/678, 348/673, 686, 687; 382/274, 260; 358/3.27, 358/532
See application file for complete search history.

(56) References Cited

U.S. PATENT DOCUMENTS

| | | | | |
|---|---|---|---|---|
| 4,887,306 A | * | 12/1989 | Hwang et al. | 382/261 |
| 4,890,162 A | * | 12/1989 | McNeely et al. | 375/240.21 |
| 5,496,106 A | * | 3/1996 | Anderson | 348/255 |
| 5,638,138 A | * | 6/1997 | Hickman | 348/678 |
| 5,699,127 A | * | 12/1997 | Ando et al. | 348/678 |
| 5,760,843 A | * | 6/1998 | Morimura et al. | 348/678 |
| 5,847,774 A | * | 12/1998 | Cho | 348/625 |
| 5,930,402 A | * | 7/1999 | Kim | 382/274 |
| 6,213,951 B1 | * | 4/2001 | Krishnan et al. | 600/458 |
| 6,256,424 B1 | * | 7/2001 | Murakami | 382/260 |
| 6,285,413 B1 | * | 9/2001 | Akbayir | 348/678 |
| 6,766,064 B1 | * | 7/2004 | Langan et al. | 382/274 |
| 6,771,320 B2 | * | 8/2004 | Choi | 348/625 |
| 6,847,738 B1 | * | 1/2005 | Scognamiglio et al. | 382/260 |
| 6,907,143 B2 | * | 6/2005 | Ferguson | 382/261 |
| 6,950,561 B2 | * | 9/2005 | Boroczky et al. | 382/263 |
| 7,064,794 B2 | * | 6/2006 | Filliman et al. | 348/678 |
| 7,102,697 B2 | * | 9/2006 | Lei et al. | 348/678 |

* cited by examiner

*Primary Examiner*—David Ometz
*Assistant Examiner*—Jean W. Désir
(74) *Attorney, Agent, or Firm*—Jianq Chyun IP Office

(57) ABSTRACT

An automatic contrast limiting circuit and method thereof with spatial domain infinite impulse response filter are disclosed. A spatial domain infinite impulse response filter is adapted to generate an output value of the spatial domain infinite impulse response filter related to an input signal. A peak value detector is adapted to detect the peak output value of the spatial domain infinite impulse response filter during a predetermined recording interval. A contrast evaluator is used to evaluate the required contrast value referring to a predetermined threshold value and the output value of the spatial domain infinite impulse response filter.

4 Claims, 4 Drawing Sheets

(a)

(b)

(c)

(a)

(b)

[AUTOMATIC CONTRAST LIMITING CIRCUIT AND METHOD THEREOF WITH SPATIAL DOMAIN INFINITE IMPULSE RESPONSE FILTER]

CROSS REFERENCE TO RELATED APPLICATIONS

This application claims the priority benefit of Taiwan application serial no.92132500, filed on Nov. 20, 2003.

BACKGROUND OF INVENTION

1. Field of the Invention

The present invention relates to an automatic contrast limiting circuit (ACL) and a method thereof, and more particularly to an automatic contrast limiting circuit and method thereof with a spatial domain infinite impulse response filter.

2. Description of the Related Art

Among image related consumer electronics, such as televisions, liquid crystal displays, digital cameras or personal computer cameras in hardware wise; and Photoshop and various image processing software in software wise, all of the above have the contrast adjusting function for improving image quality. The contrast adjusting formula is usually stated as below: Yo=Yi*contrast ... (1) Wherein Yi represents the input signal and Yo represents output signal. The contrast applied to different input and corresponding output signals is illustrated as curves in FIG. 1.

In early years, contrast is adjusted according to user's preference. Generally, when the image is dark, the contrast value may be set to high so that when the brightness of the input signals is increased, picture saturation occurs as the curves A and B demonstrated in FIG. 1. On the contrary, when the image is bright, the contrast value is reduced so that poor picture definition occurs as the curves E and F demonstrated in FIG. 1.

Ideally, picture contrast can be dynamically adjusted according to input signals. Automatic Contrast Level, i.e. ACL is, therefore devised. The principle of contrast adjustment is to maximize contrast value as possible before saturation occurs. Therefore, a predetermined threshold (e.g. "t" shown in FIG. 1) and an input-related reference value is are provided to determine contrast maximum. For the time being, generally an average picture level (APL) serves as the reference value. That is, when the input signal of the image brings out bright, APL is high and the contrast value is set to be low for avoiding the picture saturated. Whereas when the input signal of the image brings out dark, the contrast value is set to high for improving picture definition.

However, the APL method is not applicable to circumstances when background is dim, such as being indoor, in the night, in a basement, in a tunnel, in a cave or in a forest. Since picture background is low in brightness, flashlight is generally applied so as to brighten up photographing object. Yet providing the object is found relatively small to the picture area, the APL value remains low, which results in a relatively higher contrast setup referring to this APL. Therefore, the object is over saturated and the image is thus poorly defined.

SUMMARY OF INVENTION

Therefore, the object of the present invention is to provide an automatic contrast limiting circuit and method thereof with a spatial domain infinite impulse response filter, where a peak value is generated by the spatial domain infinite impulse response filtering during a recording interval for adjusting the contrast for better image quality.

In order to achieve the object above, the present invention discloses an automatic contrast limiting circuit with a spatial domain infinite impulse response filter for contrast evaluation. The automatic contrast limiting circuit with a spatial domain infinite impulse response filter comprises: a spatial domain infinite impulse response filter; a peak value detector; and a contrast evaluator. The spatial domain infinite impulse response filter is adapted to receive an input signal for generating a spatial domain infinite impulse response filtering value. The peak value detector is coupled to the spatial domain infinite impulse response filter for generating a peak value during a predetermined recording interval corresponding to the spatial domain infinite impulse response filtering value. The contrast evaluator is coupled to the peak value detector for evaluating the contrast according to the peak value and a predetermined threshold.

In the preferred embodiment of the present invention, the spatial domain infinite impulse response filter comprises: a first multiplier, an adder, and a second multiplier. The first multiplier is adapted to multiply the input signal with a first factor value for generating a first output value. The adder is coupled to the first multiplier for generating a sum of the first output value and a second output value to be the spatial domain infinite impulse response filtering value. The second multiplier is adapted to multiply the spatial domain infinite impulse response filtering value with a second factor value for generating the second output value, wherein a sum of the first factor value and the second factor value is 1.

In one preferred embodiment of the present invention, when the contrast evaluator determines the peak value higher than the predetermined threshold, the contrast value is 1; otherwise, the contrast is a value of the predetermined threshold divided by the peak value.

In a 2-D application of the present invention, the spatial domain infinite impulse response filter further comprises: a front-end spatial domain infinite impulse response filter and a front-end peak value detector. The front-end spatial domain infinite impulse response filter is adapted to receive a front-end input signal for generating a front-end spatial domain infinite impulse response filtering value. The front-end peak value detector is coupled to the front-end spatial domain infinite impulse response filter for generating a front-end peak value during a front-end predetermined recording interval as the input signal of the spatial domain infinite impulse response filter according to the spatial domain infinite impulse response filtering value.

The front-end spatial domain infinite impulse response filter comprises: a first multiplier, an adder and a second multiplier. The first multiplier is adapted to multiply the front-end input signal with a first factor value for generating a first output value. The adder is coupled to the first multiplier for generating a sum of the first output value and a second output value as the front-end spatial domain infinite impulse response filtering value is generated. The second multiplier is adapted to multiply the front-end spatial domain infinite impulse response filtering value with a second factor value for generating the second output value, wherein a sum of the first factor value and the second factor value is 1.

The present invention also provides an automatic contrast controlling method of a spatial domain infinite impulse response filter, adapted to evaluate a contrast value, which comprises: receiving an input signal for generating a spatial domain infinite impulse response filtering value;

generating a peak value during a recoding interval according to the spatial domain infinite impulse response filtering value; and evaluating the contrast value according to the peak value and a predetermined threshold.

When the peak value is higher than the predetermined threshold, the contrast value is set to 1; otherwise, the contrast is a value of the predetermined threshold divided by the peak value.

The above is a brief description of some deficiencies in the prior art and advantages of the present invention. Other features, advantages and embodiments of the invention will be apparent to those skilled in the art from the following description, accompanying drawings and appended claims.

DETAILED DESCRIPTION

Figure 1:
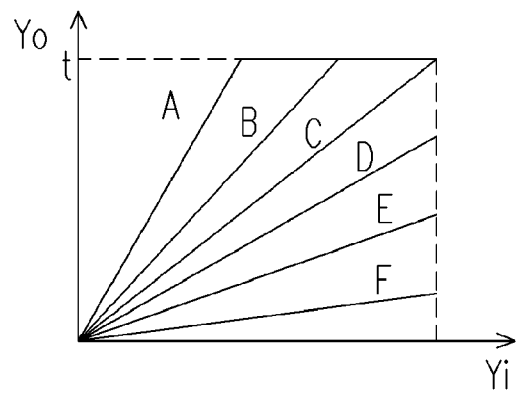
FIG. 1 is a waveform diagram illustrating input-output characteristic curves of different contrast according to conventional scheme.
Figure 2:
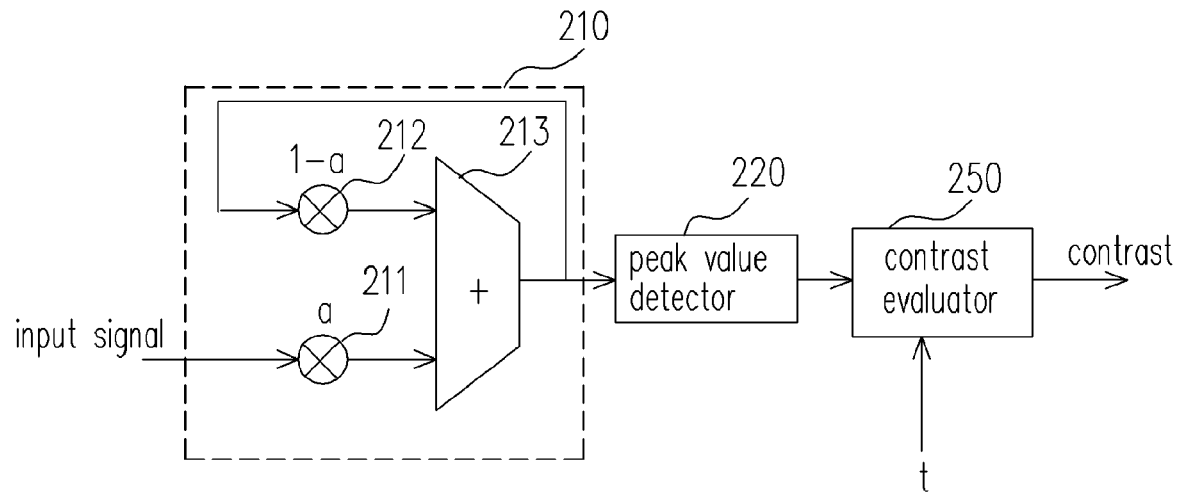
FIG. 2 is a schematic diagram illustrating an automatic contrast limiting circuit with by a spatial domain infinite impulse response filter according to one preferred embodiment of the present invention.

FIG. 2 is a schematic diagram illustrating an automatic contrast limiting circuit with a spatial domain infinite impulse response filter according to one preferred embodiment of the present invention. Referring to FIG. 2, the automatic contrast limiting circuit (ACL) 200 with a spatial domain infinite impulse response filter comprises: a spatial domain infinite impulse response filter 210; a peak value detector 220; and a contrast evaluator 250. The spatial domain infinite impulse response filter 210 comprises: a first multiplier 211, an adder 213, and a second multiplier 212.

The first multiplier 211 is adapted to multiply the input signal with a first factor value "a" for generating a first output value, which is outputted to an input terminal of the adder 213. The second multiplier 212 is adapted to multiply the spatial domain infinite impulse response filtering value outputted from the adder 213 with a second factor value "1−a" for generating the second output value, which is outputted to another input terminal of the adder 213, wherein a sum of the first factor value "a" and the second factor value "1−a" is 1. For example, when "a" is 0.1, "1−a" is 0.9. The adder 213 thus sums up 10% latest input signals and 90% accumulated signals for generating a spatial domain infinite impulse response filtering value related to past signals.

The spatial domain infinite impulse response filtering value is inputted to the peak value detector 220 so that the peak value detector 220 generates a peak value, for example, during a predetermined recording interval of a scan line, corresponding to the spatial domain infinite impulse response filtering value. The contrast evaluator 250 is coupled to the peak value detector 220 for evaluating the contrast value according to the peak value from the peak value detector 220 and a predetermined threshold "t". When the peak value is higher than the predetermined threshold "t", the contrast value is set to 1 for avoiding picture saturation. When the peak value is lower than the predetermined threshold "t", the pictures is judged too dark. In order to enhance picture definition by contrast, the contrast value is set as a value of the predetermined threshold "t" divided by the peak value.

Figure 3:
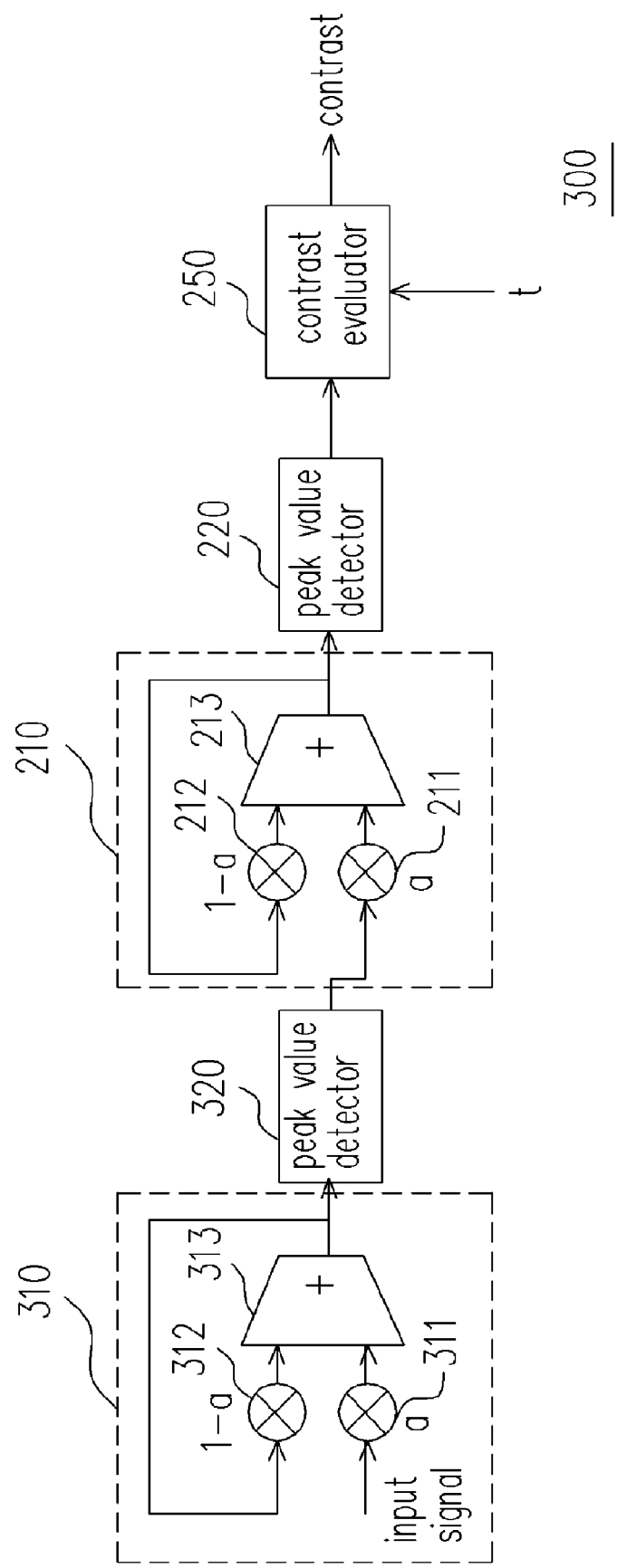
FIG. 3 is a schematic diagram illustrating a 2-D automatic contrast limiting circuit with a spatial domain infinite impulse response filter according to one preferred embodiment of the present invention.

FIG. 3 is a schematic diagram illustrating a preferred 2-D automatic contrast limiting circuit with a spatial domain infinite impulse response filter according to one preferred embodiment of the present invention. In addition to the spatial domain infinite impulse response filter 210, and the peak value detector 220 and the contrast evaluator 250 as illustrated in FIG. 3, the automatic contrast limiting circuit (ACL) 300 with a spatial domain infinite impulse response filter further comprises: a front-end spatial do main infinite impulse response filter 310 and a front-end peak value detector 320. The front-end spatial domain infinite impulse response filter 310, for generating the front-end spatial domain infinite impulse response filtering value, comprises: a first multiplier 311, an adder 313 and a second multiplier 312.

If resolution to the input signal is 1024×768, the front-end spatial domain infinite impulse response filter 310 and the front-end peak value detector 320 generates a peak value during the recoding interval for each scan line. The spatial domain infinite impulse response filter 210 and the peak value detector 220 generate a peak value during the recoding interval of each input with 768 scan lines so that the contrast evaluator 250 can evaluate the contrast value therefrom. One of ordinary skill in the art will know that the automatic contrast limiting circuit by a spatial domain infinite impulse response filter of the present invention can be applied to 3-D circuitry or higher.

Accordingly, an automatic contrast controlling method of a spatial domain infinite impulse response filter is adapted to evaluate a contrast value, which method comprises: receiving an input signal for generating a spatial domain infinite impulse response filtering value; generating a peak value during a recoding interval according to the spatial domain infinite impulse response filtering value; and evaluating the contrast value according to the peak value and a predetermined threshold.

When the peak value is higher than the predetermined threshold, the contrast value is 1 for avoiding the picture saturation. When the peak value is lower than the predetermined threshold, in order to enhance picture definition by contrast, the contrast value is set as a value of the predetermined threshold divided by the peak value.

Figure 4:
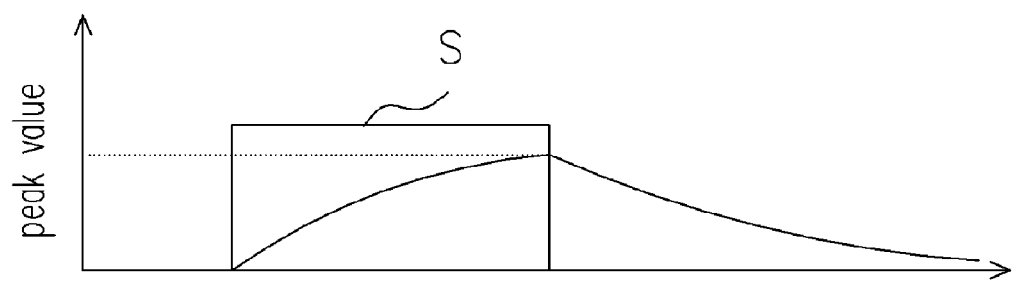
FIGS. 4(a)-(c) are waveforms illustrating different input signals and output peak values according to one preferred embodiment of the present invention.
Figure 4:
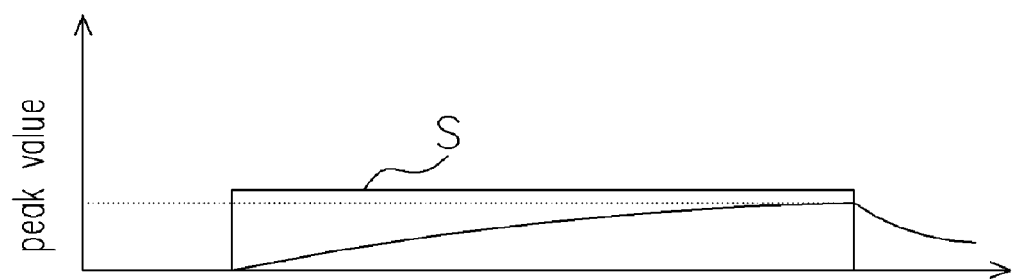
Figure 4:
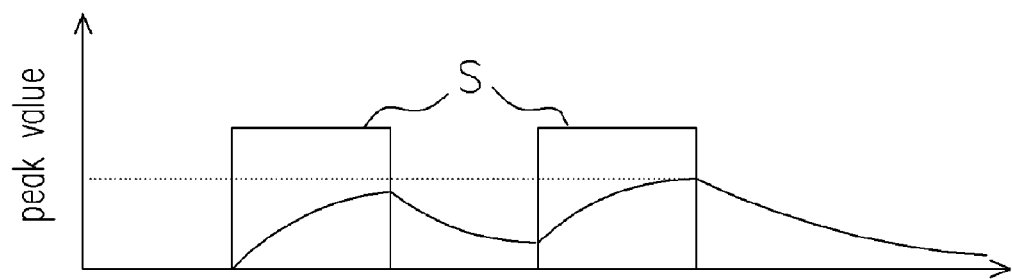
Figure 5:
FIGS. 5(a) and (b) are exemplary images corresponding to waveforms illustrated to FIGS. 4(a) and (b) respectively according to one preferred embodiment of the present invention.
Figure 5:
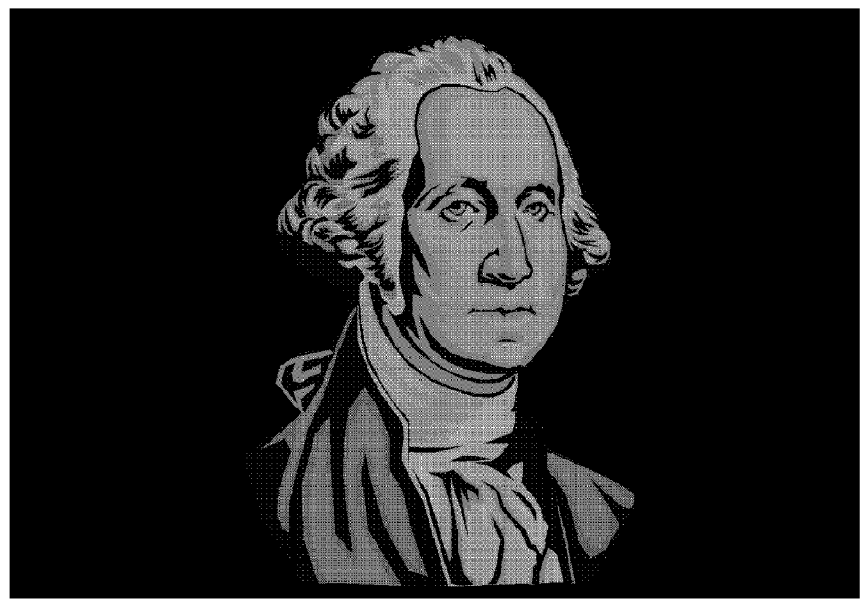

FIGS. 4 and 5 are performances of an automatic contrast limiting circuit and a method thereof with a spatial domain infinite impulse response filter in accordance with one preferred embodiment of the present invention. In the waveforms of FIG. 4(a)-(c), the horizontal axis represents the recording interval and vertical axis represents brightness of the input signals S, wherein all the input signals S in the figure have the same average picture level (APL). If APL serves to set up contrast according to the method of prior art, either the signal of FIG. 4(a) is saturated so that the outline of the picture is vague, or the signal of FIG. 4(b) is low in contrast so a same effect is resulted. Yet providing the method and the circuit thereof according to the present invention, the output peak values of the spatial domain infinite impulse response filter vary with the input signals as illustrated in the figure. As the signals shown in (a) appears to be brighter and more concentrated, the output peak value is higher and the contrast value is lower; whereas the signal shown in (b) appears to be darker, the output peak value is lower and the contrast value is higher.

Referring to the FIGS. 5(a) and (b), conditions of that are similar to those illustrated in FIGS. 4(a) and (b) correspondingly. Although the APL of the figures shown in FIGS. 5(a) and (b) are identical, the picture of 5(a) is brighter and concentrated so that the spatial domain infinite impulse response filter outputs a higher peak value for avoiding an overwhelming contrast and saturation. Yet the picture in 5(b) appears to be darker, the spatial domain infinite impulse response filter outputs a lower peak value for higher contrast and image definition.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

The invention claimed is:

1. An automatic contrast limiting circuit with a spatial domain infinite impulse response filter, for evaluating a contrast value, comprising:
   a spatial domain infinite impulse response filter, for receiving an input signal for generating a spatial domain infinite impulse response filtering value;
   a peak value detector, coupled to the spatial domain infinite impulse response filter, for generating a peak value during a predetermined recording interval corresponding to the spatial domain infinite impulse response filtering value; and
   a contrast evaluator, coupled to the peak value detector, for evaluating the contrast value according to the peak value and a predetermined threshold,
   wherein when the contrast evaluator determines the peak value higher than the predetermined threshold, the contrast value is 1; otherwise, the contrast value is a value of the predetermined threshold divided by the peak value.

2. An automatic contrast limiting circuit with a spatial domain infinite impulse response filter, for evaluating a contrast value, comprising:
   a spatial domain infinite impulse response filter, for receiving an input signal for generating a spatial domain infinite impulse response filtering value;
   a peak value detector, coupled to the spatial domain infinite impulse response fitter, for generating a peak value during a predetermined recording interval corresponding to the spatial domain infinite impulse response filtering value;
   a contrast evaluator, coupled to the peak value detector, for evaluating the contrast value according to the peak value and a predetermined threshold,
   a front-end spatial domain infinite impulse response filter, for receiving a front-end input signal for generating a front-end spatial domain infinite impulse response filtering value; and
   a front-end peak value detector, coupled to the front-end spatial domain infinite impulse response filter for generating a front-end peak value during a front-end predetermined recording interval to be the input signal of the spatial domain infinite impulse response filter according to the spatial domain infinite impulse response filtering value.

3. An automatic contrast limiting circuit with a spatial domain infinite impulse response filter, for evaluating a contrast value, comprising:
   a spatial domain infinite impulse response filter, for receiving an input signal for generating a spatial domain infinite impulse response filtering value;
   a peak value detector, coupled to the spatial domain infinite impulse response filter, for generating a peak value during a predetermined recording interval corresponding to the spatial domain infinite impulse response filtering value;
   a contrast evaluator, coupled to the peak value detector, for evaluating the contrast value according to the peak value and a predetermined threshold,
   a front-end spatial domain infinite impulse response filter, for receiving a front-end input signal for generating a front-end spatial domain infinite impulse response filtering value; and
   a front-end peak value detector, coupled to the front-end spatial domain infinite impulse response filter for generating a front-end peak value during a front-end predetermined recording interval to be the input signal of the spatial domain infinite impulse response filter according to the spatial domain infinite impulse response filtering value,
   wherein the front-end spatial domain infinite impulse response filter comprises:
      a first multiplier, for multiplying the front-end input signal with a first factor value for generating a first output value;
      an adder, coupled to the first multiplier for generating a sum of the first output value and a second output value to be the front-end spatial domain infinite impulse response filtering value; and
      a second multiplier, for multiplying the front-end spatial domain infinite impulse response filtering value with a second factor value for generating the second output value, wherein a sum of the first factor value and the second factor value is 1.

4. An automatic contrast controlling method of a spatial domain infinite impulse response filter, adapted to evaluate a contrast value, comprising:
   receiving an input signal for generating a spatial domain infinite impulse response filtering value;
   generating a peak value during a recoding interval according to the spatial domain infinite impulse response filtering value; and
evaluating the contrast value according to the peak value and a predetermined threshold,
wherein when the peak value is higher than the predetermined threshold, the contrast value is 1; otherwise, the contrast value is a value of the predetermined threshold divided by the peak value.

* * * * *